United States Patent Office 3,225,712
Patented Dec. 28, 1965

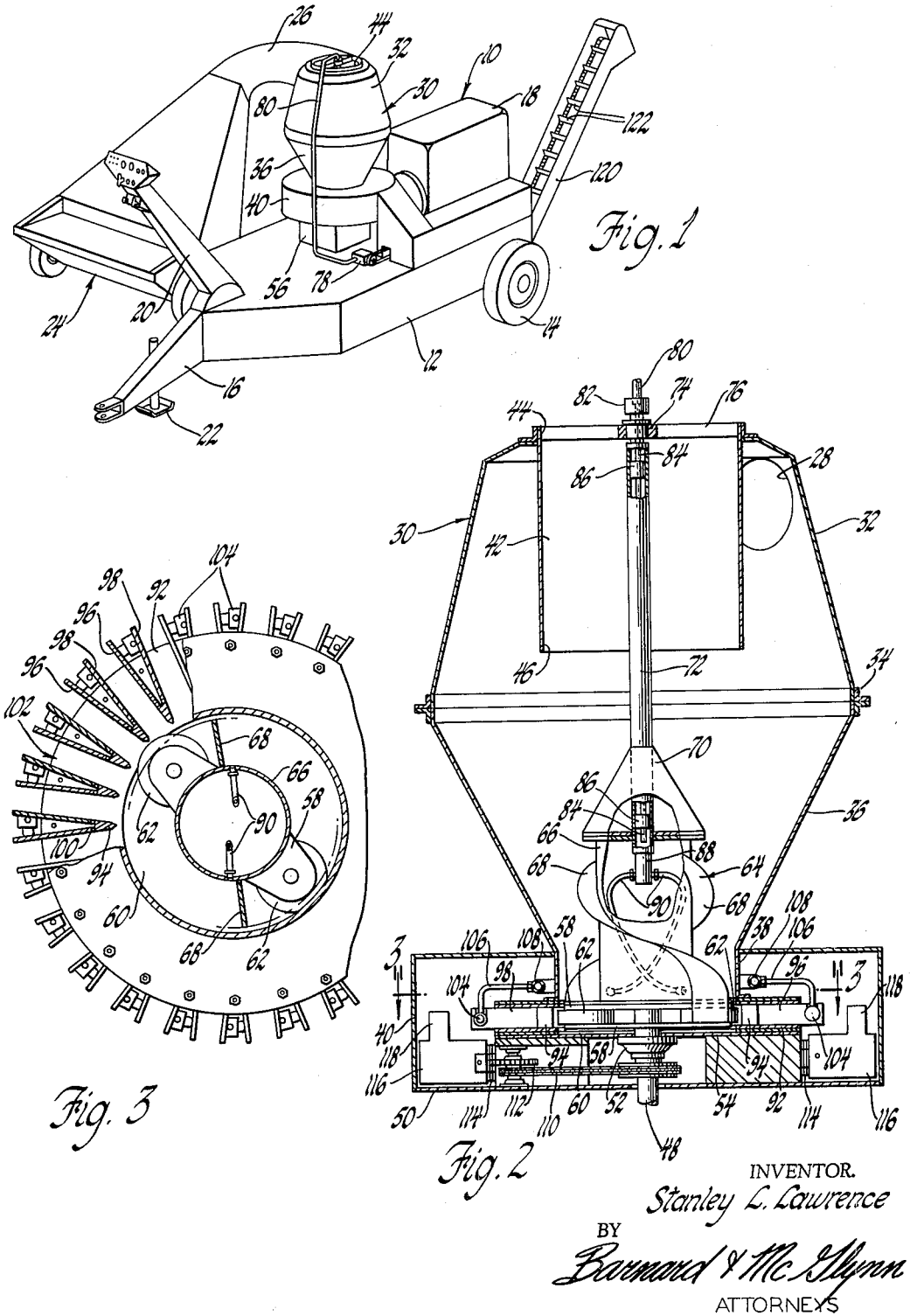

3,225,712
HAY WAFERING APPARATUS
Stanley L. Lawrence, Livonia, Mich., assignor to Massey-Ferguson Inc., Detroit, Mich., a corporation of Maryland
Filed Aug. 23, 1962, Ser. No. 218,964
7 Claims. (Cl. 107—14)

This invention relates to an apparatus for producing hay wafers and, in particular, to an apparatus for field wafering forage crops into hay wafers particularly characterized by an improved means for applying moisture to the hay to be wafered.

In recent times, apparatus have been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the chamber into and through the die cells to form hay wafers. A rotatable multiple flight feed auger has been disposed within an enclosing feed hopper having one end thereof communicating with the aforementioned chamber. Such an apparatus has further included a pick-up mechanism, often of the rotary flail type including a plurality of spaced rapidly rotatable flails or arms, for picking up and delivering hay, preferably preconditioned or processed, finely chopped, mixed and blended hay from a windrow within a field, to the aforementioned hopper for feed therefrom to the wafering chamber. As a result as such an apparatus moves through a field of mown hay, the latter is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged with an ejection means adjacent the exit end of each of the die cells to break the respective extrusions of hay into hay wafers of substantially uniform length which then preferably fall upon a conveyor means for removal from the apparatus.

An apparatus of the type aforementioned has further included a relatively large number of water nozzles or the like, such as eight thereof, spaced on the apparatus so as to spray water moisture on the hay crop as it is delivered from the aforementioned pick-up mechanism to the hopper enclosing the feed auger. In this regard, application of such moisture has been considered to be desirable for various reasons including, by way of example, that of facilitating the tendency of the hay fibers or components to become more pliable, stick together and, in general, set into the desired shape upon completion of the wafering operation as will be described hereinafter. In addition, such a moisture applying means may also be utilized to add certain desired nutrients to the hay to be wafered for use as livestock feed. In any event, the application of water moisture to the hay has been a relatively random or hit and miss proposition bearing little relation to the ultimate moisture content of hay laid upon the entrance ends of the die cells for compaction therethrough. In other words, the approach heretofore has been to spray at random the bulk of hay being delivered to the hopper which is then fed therethrough by the feed auger to the wafering chamber to be acted upon the rotary compaction or compression means, and some hay may not receive any moisture at all and that hay which does receive such moisture can dry to varying degrees as it is fed through the hopper to the wafering chamber.

The present invention contemplates an improved method and apparatus for making compressed hay wafers and of the general type aforementioned having an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, and particularly characterized by a feed hopper having one end thereof communicating with the aforementioned wafering chamber, a multiple flight feed auger rotatably mounted within the hopper for feeding hay therefrom to the aforementioned wafering chamber, and means for supplying water moisture or the like to the hay being fed from the hopper by the feed auger and immediately prior to laying such hay in the wafering chamber, thereby insuring an adequate moisture content for the hay which is then wafered.

More specifically, the present invention contemplates an improved apparatus of the type aforementioned particularly characterized by a feed auger means including a hollow hub having one end thereof drivingly connected to the aforementioned rotary hay compaction or compression means for rotation therewith, a plurality of auger flights secured to the exterior of the hub of the feed auger for feeding hay from the hopper into the aforementioned wafering chamber, and means including a plurality of moisture supply conduits corresponding to the number of the auger flights disposed within the aforementioned hub of the auger and connected to the exterior thereof adjacent and in advance of the rotative path of the respective auger flights to supply moisture to hay traveling along each auger flight immediately prior to such hay being delivered into the wafering chamber. As a consequence, moisture is applied to the hay to be wafered immediately prior to the feeding of the latter into the wafering chamber, thereby providing more accurate and positive control of the application of moisture to the hay then heretofore possible.

In order to facilitate an understanding of the invention, a preferred embodiment thereof will now be described with reference to the accompanying drawing in which:

FIGURE 1 is a perspective view of a hay wafering apparatus illustrating a preferred embodiment of the invention;

FIGURE 2 is an enlarged fragmentary vertical sectional view through the apparatus of FIGURE 1 illustrating certain details thereof; and FIGURE 3 is a fragmentary sectional view, partly broken away to illustrate certain details of the construction, taken on line 3—3 of FIGURE 2.

Referring now to the drawing, the numeral 10 in FIGURE 1 generally indicates a hay wafering apparatus comprising a frame 12 equipped with the usual ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and includes an output shaft, not shown, connected in the conventional manner to various instrumentalities of the apparatus to drive the latter as will become more fully apparent hereinafter. A control pedestal 20 is provided on the frame and mounts at the upper end thereof a control panel having instruments thereon for controlling the engine 18 and other instrumentalities of the apparatus. An adjustable foot 22 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay in a given windrow is adapted to be picked up in a suitable pick-up mechanism preferably of the well known wheeled rotary flail type indicated generally at 24 and comprising a plurality of rapidly rotatable flails or arms which pick up and direct the homogenized hay in an accompanying air stream into the delivery chute 26, which delivers the hay and air stream to an opening 28 in the upper end of a vertically disposed hopper indicated generally at 30.

Referring now more particularly to FIGURE 2, it may be seen that the hopper 30 comprises an annular axially downwardly and outwardly tapered upper section 32 having its lower end suitably secured as indicated at 34 to the upper end of an axially downwardly and inwardly tapered lower section 36 terminating in a cylindrical wall portion 38 suitably secured within an annular housing 40 suitably supported on frame 12. A cylindrical axially extending vent duct 42 includes an open upper end 44 suitably rigidly secured to the upper end of the upper section 32 of the hopper, and depends therefrom interiorly and substantially coaxially of the hopper toward a lower open end 46 thereof.

As hay is delivered through the opening 28 into the upper section of the hopper with its accompanying air stream, it is initially discharged into the hopper between the upper section thereof and the duct 42, and due to the tapered configuration of the upper section of the hopper, the hay and air stream swirl axially downwardly in cyclone fashion in the space between the upper section of the hopper and the duct. As a result, the heavier particles of hay separate from the accompanying air stream while the latter loses some of its velocity imparted thereto by the rapidly rotating flails of the rotary flail type pickup mechanism due to the downwardly increasing annular area defined between the wall of the upper section of the hopper and the wall of the duct. Consequently, the heavier hay particles swirl axially downwardly along the wall of the lower section thereof and travel toward wall portion 38 entering housing 40, while the accompanying air stream is vented to atmosphere by entering the lower open end 46 of the duct, passing therethrough and emerging exteriorly thereof through the upper open end 44 thereof. As a result of this cyclonic swirling type of separation of the latter to atmosphere, a build up of back pressure is prevented within the hopper which otherwise may retard delivery of hay to be wafered through the opening 28 into the hopper.

A vertically disposed drive shaft 48 extends through the bottom wall 50 of housing 40 and is suitably rotatably supported by bearing means 52 mounted on a floor member 54 within the housing, the drive shaft being suitably coupled to and driven by the engine 18 in a well known manner as by gearing or the like disposed in housing 56 beneath the housing 40. A pair of spaced horizontal radially extending arms 58 have their central portions suitably rigidly secured to the drive shaft 48 for rotation therewith within the wafering chamber 60, and have journaled at the opposite ends thereof a pair of rotatable compaction or compression rollers 62 which travel in rotative paths within the wafering chamber immediately below the cylindrical wall portion 38 at the lower end of the lower section 36 of the hopper and immediately above the floor member 54.

A feed auger means is indicated generally at 64 in FIGURE 2 and comprises a hollow cylindrical hub 66 having its lower end suitably rigidly secured to the upper arm member 58 of the rotary compaction or compression means for rotation with the latter and projecting upwardly therefrom substantially coaxially with the drive shaft 48 and the hopper 30, and has mounted on the exterior surface thereof in the usual manner two auger flights 68 having their lower ends terminating immediately in advance of the rotative clockwise path of travel of the respective rollers 62 as illustrated in FIGURE 3. A tapered conical head member 70 is secured at the upper end of the hub 66 and is suitably secured to a hollow shaft 72 rotatably supported at its upper end in bearing means 74 carried, by way of example, by a rib member 76 extending radially between opposite sides of the duct 42 at the upper open end of the latter. As will be apparent from FIGURE 2, the respective flights 68 of the feed auger means taper axially upwardly and inwardly from their lower ends toward their upper ends adjacent the conical head member 70.

It will now be apparent that the hay supplied to the hopper 30 will swirl axially downwardly thereof as previously described and will be fed axially of and somewhat radially inwardly toward the hub 66 and onto the respective flights 68 of the feed auger means. The tapered configuration of the respective flights of the feed auger means insure that a portion of each flight immediately below an upper portion thereof projects outwardly sufficiently from the latter so as to receive some of the hay so delivered, thereby contributing to optimum uniform distribution of the hay to the feed auger means and supply thereof to the wafering chamber 60.

A water pump 78 is provided on the frame 12 of the apparatus and is adapted to be driven in a suitable manner from the engine 18 to supply a stream of water through a stationary conduit 80 connected through a suitable rotatable sealing member 82 to the upper or inlet end of a feed pipe or conduit 84 suitably fixedly secured as by spaced mounting members 86 interiorly of the shaft 72 for rotation with the latter. At its lower or outlet end, the feed pipe or conduit 84 discharges into a hollow manifold or plug 88 fixedly secured to the lower end of shaft 72 interiorly of the hub 66 of the feed auger means. A suitable number of supply conduits 90, in this case a pair thereof corresponding to the pair of auger flights 68, are contained within the hub 66 and has one end thereof suitably connected to the manifold or plug 88 and the other end thereof secured within an aperture in the hub of the feed auger means immediately adjacent lower portions of each of the respective auger flights 68 and in advance of the path of travel thereof. Preferably, the discharge or outlet ends of the supply conduits 90 are slightly recessed from the exterior surface of the auger hub 66 to prevent clogging thereof, and may be provided with nozzles if desired although the latter are not essential.

Thus, a stream or spray of water may be supplied to the lower portion of each of the auger flights 68 as the hay to be wafered passes axially therealong thereby insuring that the hay receives a suitable and desired amount of moisture immediately prior to such hay being fed to the wafering chamber 60 and hence facilitating the tendency of the hay to become more pliable, stick together and, in general, set into the desired shape upon completion of the wafering operation as will be described hereinafter.

The wafering chamber 60 includes a pair of vertically spaced parallel annular die wall members 92 having fixedly disposed therebetween an annular or circumferentially spaced series of knife edges 94. An annular or circumferentially spaced series of pairs of side die wall members 96 and 98 are disposed between the die wall members 92 and have their radially inner ends suitably hingedly connected as indicated at 100 adjacent a respective fixed knife edge 94 to form an annular or circumferential spaced series of axially open radially extending die cells, indicated generally at 102, between die wall members 92 and the respective oppositely spaced side die wall members 96 and 98 of an adjacent pair thereof. As will be apparent, the axes of the respective die cells are contained in a common horizontal plane or a plane parallel to the ground and the entrance ends thereof communicate with wafering chamber 60. The numeral 104 indicates the conventional hydraulically operated motor assemblies of the type comprising relatively reciprocable piston and cylinder elements interposed between each hinged pair of side die wall members 96 and 98 to control their angular relationship relative to each other and, hence, the extent to which the cross section of each die cell converges towards its exit end. The respective motor assemblies are supplied in the usual manner through conduits 106 connected to a common annular manifold 108 connected to a source of fluid under pressure controlled from the control panel on the control pedestal 20.

As will be readily apparent particularly from FIGURES 2 and 3, the rollers 62 are positioned closely to but do not engage the knife edges 94. Thus, hay fed continuously by the auger feed means 64 from the hopper 30 into the wafering chamber 60 is laid across the knife edges and the entrance ends of the respective die cells in advance of the rotative path of the rollers 62, which rollers compact or compress the hay and force it past the knife edges and into and through the respective die cells upon successive rotative passes thereof.

A drive sprocket is secured to the drive shaft 48 beneath the floor member 54 within the annular housing 40, and is connected through the drive chain 110 to a sprocket mounted on a vertical shaft suitably rotatably mounted within the housing 40. A gear wheel 112 secured on this shaft engages an annular or circumferentially spaced series of drive pins 114 of an annular conveyor mechanism including a plurality of annularly or circumferentially spaced conveyor paddles 116. The conveyor paddles travel in a continuous path about the exit ends of the die cells and are disposed immediately below the horizontal plane thereof. A suitable number of break-off tabs 118 each upstand from respective ones of the conveyor paddles 116 and project into the horizontal plane of the die cells so as to be engageable with a radially outer portion of a given extrusion of hay emerging therefrom. As a break-off tab so engages an extrusion of compacted or compressed hay, the latter is caused to bend and break substantially at the exit end of its associated die cell to form a wafer which then drops onto the bottom wall 50 of housing 40 and is conveyed therealong by the associated conveyor paddle. As will be appreciated, the gear reduction between the drive shaft 48 and the conveyor mechanism aforedescribed and, hence, the timing of the latter is such as to permit a predetermined length of extruded hay to overhang from the exit ends of the die cells before being engaged by a break-off tab 118.

The hay wafers which fall upon the bottom wall 50 of housing 40 are moved therealong as aforedescribed until reaching an opening or the like therein, not shown, communicating with one end of an elevator type conveyor 120 of conventional construction equipped with spaced conveyor paddles 122 which pick up the hay wafers and convey them from the apparatus preferably into a trailing conveyance.

The embodiments of the invention in which an exclusive property or privilege is claimed are defined as follows:

1. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a feed hopper having one end thereof communicating with said chamber, rotatable feed auger means mounted within said hopper and including a hollow hub having one end thereof drivingly connected to said rotary hay compaction means for rotation therewith; a plurality of auger flights secured to the exterior of said hub for feeding hay therealong from said hopper into said chamber, and moisture supply means including a plurality of moisture supply conduits corresponding to the number of said auger flights disposed within said hub and discharging exteriorly of the latter adjacent and in advance of the rotative paths of said respective auger flights to supply moisture to hay traveling therealong to said chamber.

2. The apparatus according to claim 1 in which said moisture supply means further includes a moisture manifold within said hub and connected to said supply conduits.

3. The apparatus according to claim 1 in which said moisture supply means further includes a moisture manifold mounted within said hub and connected to said supply conduits, and means for feeding moisture to said manifold.

4. The apparatus according to claim 3 in which said means for feeding moisture to said manifold comprises a feed conduit fixed for rotation with said hub and having an inlet end and an opposite outlet end communicating with said manifold, and means including a rotary sealing means communicating a source of moisture to said inlet end of said feed conduit.

5. The apparatus according to claim 3 in which said means for feeding moisture to said manifold comprises a hollow shaft fixed for rotation with said hub and mounting said manifold at one end thereof within said hub and the other end thereof being rotatably supported at the other end of said hopper, a moisture feed conduit secured within said hollow shaft for rotation therewith and having an outlet end communicating with said manifold, and an inlet end at said other end of said hollow shaft, and means including a rotary sealing means communicating a source of moisture to said inlet end of said feed conduit.

6. The apparatus according to claim 1 in which the discharge ends of said supply conduits are recessed within the wall of said hub from the exterior of the latter.

7. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a feed hopper having one end thereof communicating with said chamber, rotatable feed auger means mounted within said hopper and including a hollow hub having one end thereof drivingly connected to said rotary hay compaction means for rotation therewith, at least one auger flight secured to the exterior of said hub for feeding hay therealong from said hopper into said chamber, and moisture supply means disposed within said hub and discharging exteriorly of the latter adjacent and in advance of the rotative path of said auger flight to supply moisture to hay traveling therealong to said chamber.

References Cited by the Examiner

UNITED STATES PATENTS

| | | |
|---|---|---|
| 858,352 | 6/1907 | Sharpneck. |
| 1,238,981 | 9/1917 | Barton. |
| 2,887,718 | 5/1959 | Curran et al. _____ 100—73 X |

FOREIGN PATENTS 1,250,174  11/1960  France.

196,947  5/1923  Great Britain.
450,718  7/1936  Great Britain.
505,231  5/1939  Great Britain.

OTHER REFERENCES

"Western Livestock Journal," April 1961, pages 36 and 39.

"Agricultural Engineering," S 671.A3, August 1961, pages 412–415 and 423.

WALTER A. SCHEEL, *Primary Examiner.*